United States Patent
Colburn

[15] 3,690,212
[45] Sept. 12, 1972

[54] PIANO INSTRUCTION DEVICE
[72] Inventor: John P. Colburn, 360 Sherman Ave., Council Bluffs, Iowa 51501
[22] Filed: Dec. 17, 1970
[21] Appl. No.: 99,027

[52] U.S. Cl. ................................................. 84/478
[51] Int. Cl. .............................................. G09b 15/08
[58] Field of Search ......... 84/470, 471, 477, 478, 482

[56] References Cited

UNITED STATES PATENTS

| | | | |
|---|---|---|---|
| 1,728,191 | 9/1929 | Votey | 84/478 |
| 3,460,426 | 8/1969 | Jensen | 84/478 |
| 3,379,087 | 4/1968 | Weitzner | 84/478 |
| 2,728,258 | 12/1955 | Stegner | 84/464 |
| 3,357,637 | 12/1967 | Stautmeister | 235/144 |
| 3,353,435 | 11/1967 | Schmoyer | 84/478 |

*Primary Examiner*—Richard B. Wilkinson
*Assistant Examiner*—Lawrence R. Franklin
*Attorney*—Le Blanc & Shur

[57] ABSTRACT

A device for teaching pupils to read music and identify notes on a key-board instrument and to promote proficiency in the performance of musical exercises is presented. The device includes a scale representation visually displaying notes as flashing lights, controlled by an electro-mechanical signal device for successively displaying pre-selected combinations of notes on the scale for a pre-selected period of time. The keyboard, and pedals of the instrument if desired, are adapted to interrupt the flashing note-lights to display a continuous light only when the correct key or pedal is depressed.

7 Claims, 6 Drawing Figures

PATENTED SEP 12 1972
3,690,212
SHEET 1 OF 2
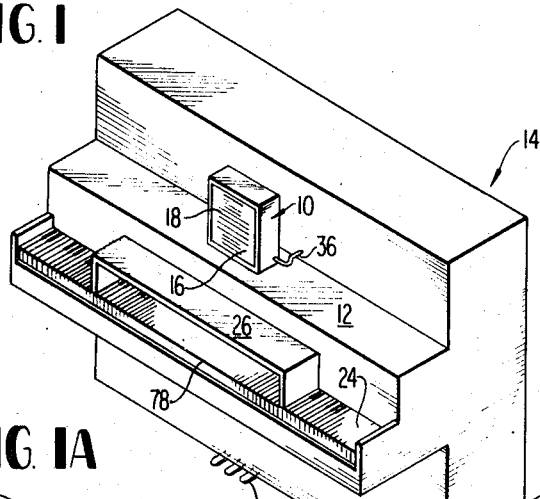
FIG. 1
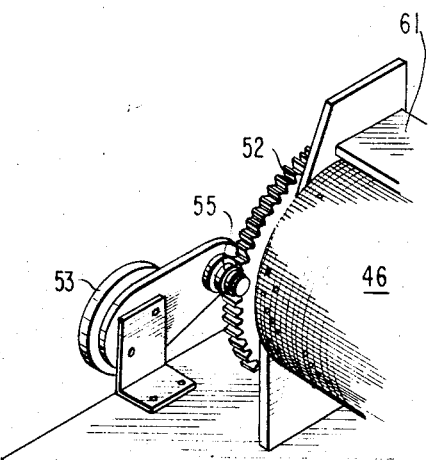
FIG. 6
FIG. 1A
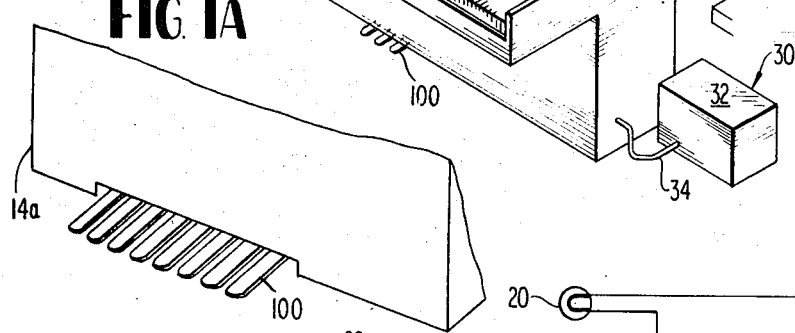
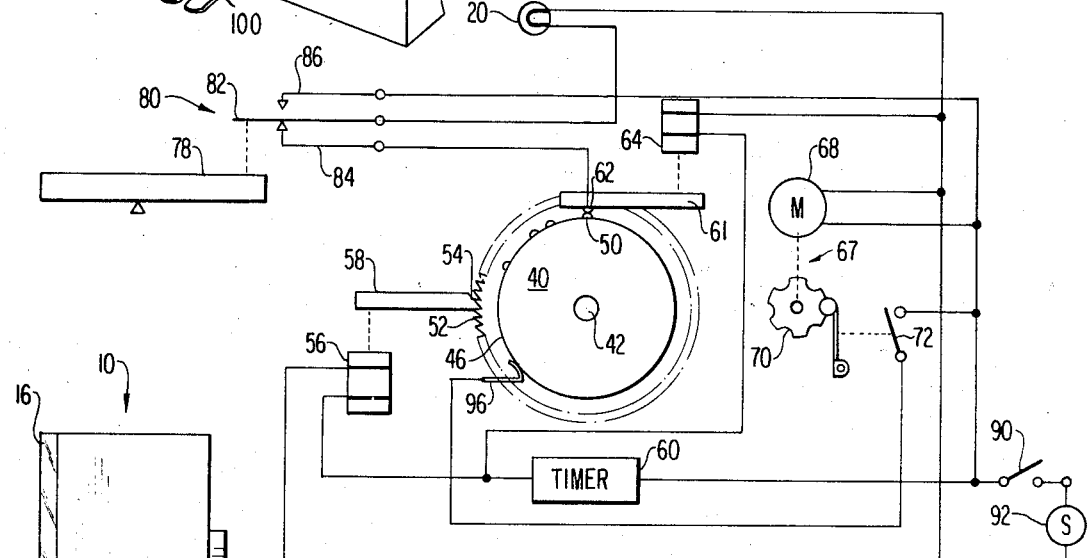
FIG. 2
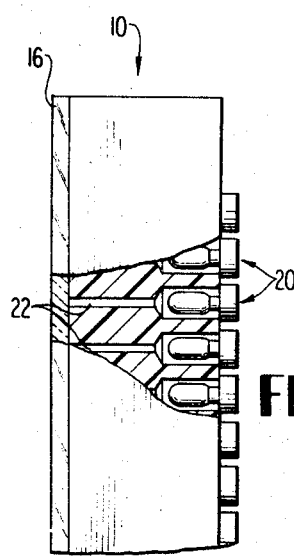
FIG. 5
INVENTOR
JOHN P COLBURN
BY  Le Blanc & Shur
ATTORNEYS

PIANO INSTRUCTION DEVICE

This invention relates to a device for teaching a pupil to play and read music. The device is intended for use with any piano or organ of conventional design. The device functions to display a particular musical exercise for the student, and to indicate whether the exercise has been correctly performed. The device also includes a capability for displaying, in sequence, a series of musical exercises.

Various types of instruction devices for use with key-board instruments are well know. Certain of these devices utilize a visual scale depicting notes. For example, a common device monitors the student's keyboard, recording the notes played and computing errors made. In another device, the instructor and the student simultaneously play the same exercise, and the device compares the notes played and computes deviations resulting from student errors.

The prior instruction devices known do not meet the student's needs for efficient instruction. Errors should be indicated to the student as the exercise is played, so that the student may visually observe the incorrectly played notes. In addition, no prior device known may be utilized to display successive musical exercises at timed intervals so that the instructor may program the teaching device for a series of exercises. Also, no device known combines the above features with the capability of use with either advanced or beginning students, either in the instructor's presence, or without the instructor, to perform a teaching function efficiently and dependably.

The deficiencies and inadequacies of prior teaching devices are overcome by the instant invention wherein a screen is mounted on the piano music rack, which screen contains illumination elements oriented to display musical notes on a scale inscribed thereon. A rotatable drum containing oriented electrical contacts is utilized to energize selected lights corresponding to the particular notes to be played, and switches carried by each key are adapted to indicate in the light display on the screen when the correct key is depressed.

In a preferred embodiment, a flasher is coupled, in an electric circuit, to the screen lights and to each key so that the musical exercise to be played is displayed as flashing lights on a musical scale. As each key is correctly depressed, the flasher circuit is by-passed and a steady light is displayed in the corresponding note location on the scale. The signal device is also designed to display the signals for a pre-selected period of time. At the expiration of the time alloted, the signal device changes the exercise displayed to a different display. In this way, a series of exercises may be displayed in timed sequence for the student to play.

Accordingly it is an object of this invention to provide a device for use instructing students in reading sheet music and playing thereof on key-board instruments.

It is another object to provide a portable, self-contained electro-mechanical teaching device for use by a pupil either with or without the teacher being present, adaptable for use either by a beginner or an advanced pupil to promote sight reading and instrument proficiency.

It is a further object to provide a teaching device for key-board instruments such as the piano and organ, which device visually displays notes to be played and signals the student when each note is correctly played.

It is yet another object to provide a teaching device for piano and organ which displays, as flashing lights on a musical scale screen, a series of note exercises to be played in timed sequence so that when each note is correctly played within the time period alloted the flashing light is replaced be a steady light.

It is yet another object to provide a reading and teaching device for key-board instruments adaptable to display, on a representation of a musical scale staff, flashing lights corresponding to notes to be played within a pre-set time period after which they are automatically replaced by a different set of notes for another period of time.

These and other objects will become readily apparent with reference to the following drawings and description wherein:

FIG. 1 is a plan view of a piano with the device of this invention mounted thereon.

FIG. 1A is a fragmentary perspective view illustrating the pedals of an organ.

FIG. 2 is a schematic illustration of the device of this invention.

FIG. 5 is a partial sectional view of the scale screen on which the visual problems are displayed.

FIG. 6 is a plan view of an optional drive for the pre-programmed signal unit.

Figure 3:
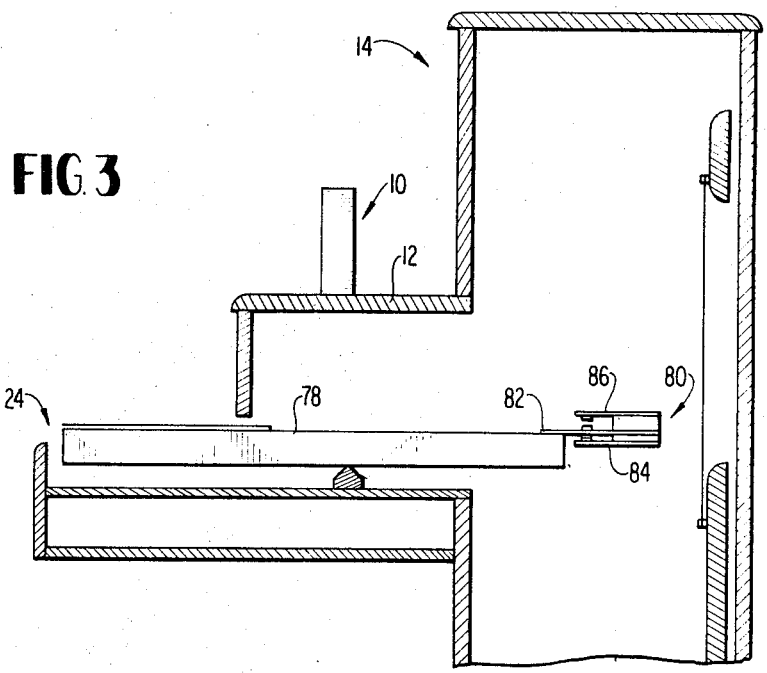
FIG. 3 is a fragmentary sectional view showing a portion of the piano in FIG. 1.

With attention to FIGS. 1 and 5 the device of this invention includes a visual scale screen 10 which is adapted to be mounted on the music rack 12 of a piano 14. The screen 10 includes a face 16 which preferably has a base and a treble staff 18 inscribed thereon. A sub-miniature light bulb 20 for each note in a range to be played is mounted in the rear of screen 10. The bulbs 20 may be colored to denote sharps and flats if desired. Each bulb 20 has a light focusing channel 22 to illuminate each note on the scale staff 18 on face 16 of screen 10 corresponding to a particular key on key-board 24 of piano 14.

As shown in FIG. 1 a key-board cover 26 may be used to cover a portion of key-board 24 corresponding to the range of notes available on staff 18 so that the student will be forced to play without watching his hands.

Figure 4:
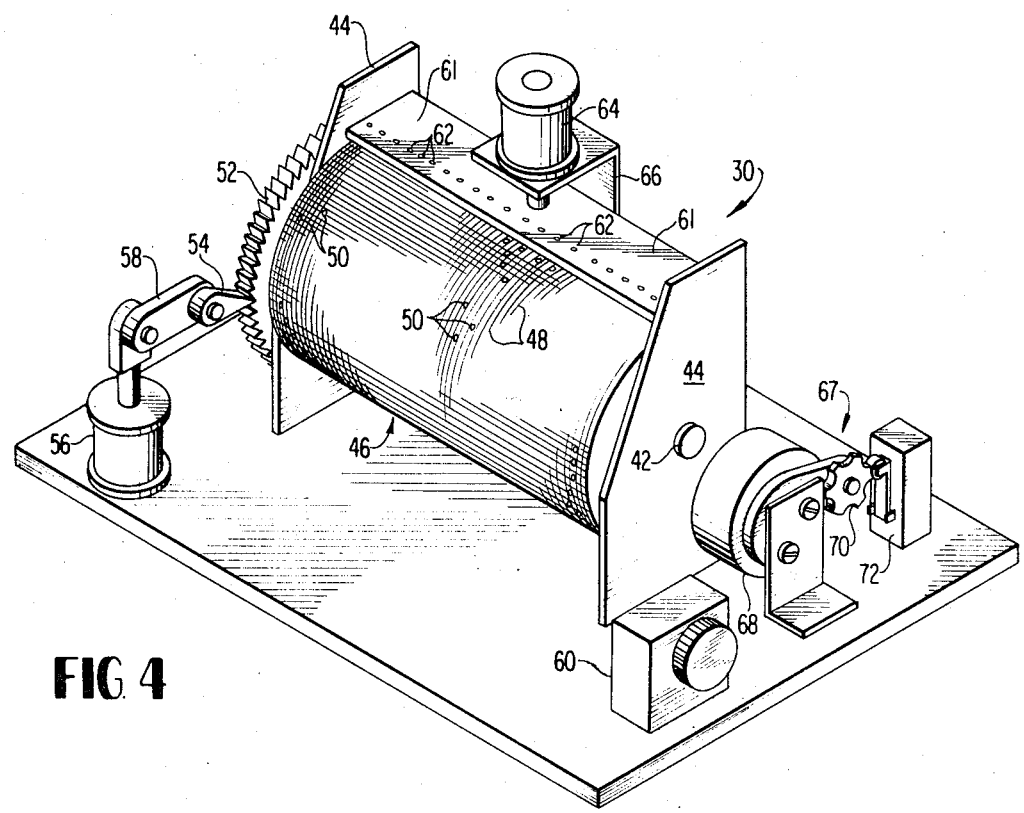
FIG. 4 is a plan view of a pre-programmed signal device which projects the visual key-board problems to be executed by the student.

The pre-programmed signal unit 30 shown in FIG. 4 may be self-contained in a case 32 as shown in FIG. 1 and removably connected by lead 34 to the circuitry within the piano, and thru lead 36 to screen 10 as will be subsequently explained. In the alternative, unit 30 may be mounted within the piano 14.

With attention to FIG. 4, the signal unit 30 may be described as follows. A drum 40 of insulating material is mounted on a shaft 42 and rotatably supported in a mounting bracket 44. Metal mesh 46 surrounds the external surface of the drum 40 and divides the surface into a series of squares, which define mutually spaced pin receiving slots 48 in the surface of drum 40. Each slot 48 in the axial direction along drum 40 corresponds to a key on key-board 24 within the desired playing range under cover 26, and each axial row corresponds to a separate student exercise.

Metal pins 50 are inserted into slots 48. Each pin 50 contacts the mesh 46 and extends upwardly from its slot on the surface of drum 40 and from the mesh 46. In a preferred embodiment four octaves of the key-board or 49 keys are utilized for student instruction. Therefore 49 squares extend in the axial direction on drum 40 defining 49 pin receiving slots to make up a single row of squares 48.

Drum 40 may be rotated to change exercises by any conventional drive system. A preferred system is shown in FIG. 4, and described as follows. Gear 52 is rigidly and coaxially mounted on shaft 42. Drum 40 is advanced by the action of ratchet pawl 54 with gear 52. A solenoid 56 mounts biased pivot arm 58 which in turn mounts pawl 54. A variable interval timer 60 controls rotation of a drum 40 by energizing solenoid 56 at preselected intervals of, for example one to 10 times per minute. When timer 60 energizes solenoid 56 pivot arm 58 and ratchet pawl 54 advance, by one tooth, gear 52, which action causes drum 40 to rotate a corresponding amount. When the solenoid is de-energized the bias on arm 58 returns the arm to its rest position shown in FIG. 4 until the solenoid 56 is energized again.

Panel 61 is constructed of insulating material and is slidebly mounted on bracket 44 adjacent drum 40. Panel 61 mounts a plurality of spring contacts 62. Contacts 62 are mounted parallel to the axis of drum 40. Each contact 62 corresponds to a key on the keyboard 24, and a light bulb 20 in screen 10. Contacts 62 are adapted to engage pins 50 in slots 48, when the pins 50 are disposed thereunder, without touching mesh 46. Solenoid 64 mounted on bracket 66 engages panel 61. Solenoid 64 is also energized by timer 60 so that when the timer 60 causes solenoid 56 to advance drum 40, solenoid 64 is energized to simultaneously remove contacts 62 from engagement with pins 50.

It will be obvious to those skilled in the art that drum 40 may optionally be rotated by a variety of different devices other than solenoid 56, arm 58, and pawl 54. For example, a motor 53 and ratchet gear 54 may be used either to supplement the action of the pivot arm 58 and pawl 54 or in place thereof. This alternate drive system is shown at FIG. 6. When utilized, timer 60 will energize motor 53 in the same manner as solenoid 56 to advance the drum 40.

The pulsating voltage which flashes bulbs 20 on screen 10 may be provided by any conventional flasher circuit. A preferred flasher 67 shown in FIG. 4 is a gear motor 68 which is utilized to drive a pulse wheel 70 which wheel acts on a micro-switch 72 to generate a pulsating voltage for light bulbs 20.

With attention to FIG. 3, each key, or pedal as the case may be, 78 on keyboard 24 actuates a switch 80. Leaf switch 82 normally contacts a blade 84 coupled through spring contacts 62, pins 50 and mesh 46 to the flasher 67. When key 78 is depressed, leaf 82 is disconnected from blade 84 and contacts blade 86 coupled to a steady, non-pulsating voltage.

With attention to the schematic illustration of FIG. 2, when switch 90 is closed a current from source 92 applies a voltage of for example 24 volts to timer 60, blade 86, and flasher circuit 67. Motor 68 in circuit 67 acting through pulse wheel 70 and micro-switch 72 then causes the application of a pulsating voltage to mesh 46 thru spring wiper arm 96.

When pin 50 engages spring contact 62 in panel 61 the pulsating voltage on mesh 46 is also applied, thru blade 84 and leaf 82 to bulb 20 causing the said bulb to flash.

When key 78 is depressed, leaf 82 switches from blade 84 to blade 86 which action by-passes flasher circuit 67 and causes the application of a steady voltage to bulb 20. The action of switch 80 responsive to the depression of key 78 changes flashing light 20 to a steady light.

Following the expiration of a pre-set period of time, timer 60 energizes solenoids 56 and 64. Solenoid 56 acting on biased arm 58 and pawl 54 causes the drum 40 to advance in a counterclockwise direction. Solenoid 64, energized by timer 60, acts on panel 61 to separate contacts 62 from pins 50 while the drum 40 rotates to align the next row of pins 50. When the timer 60 de-energizes solenoid 56 the biased arm 58 returns pawl 54 to a rest position and blade 61 is lowered to place contacts 62 in engagement with the pins 50 disposed thereunder.

In summary, the instructor pre-programs the signal device 30 by placing pins 50 in slots 48 corresponding to those keys 78 which he wishes to have played. Each axial row corresponds to a separate exercise. When the device of this invention is actuated a row of pins 50 is rotated into engagement with contact 62 which causes bulbs 20 corresponding to the pins present in the row, to display, on screen 10, a set of flashing notes. The displayed notes continue to flash until the corresponding key 78 on key-board 24 is depressed. The bulbs 20 then change from flashing to steady light.

At the expiration of a pre-set period of time, timer 60 energizes solenoids 56 and 64. The solenoid 56 then rotates the drum 40 to the next axial row of pins 50, representing the next exercise, and simultaneously disconnects the existing display on the screen 10.

In this manner a series comprising any number of individual exercises may be displayed sequentially at any speed desired to accommodate pupils from beginners to the more advanced.

Although the foregoing has described the use of the device this invention with key-board instruments it will be obvious that the invention is not limited thereto but may be incorporated within the scope thereof for use with the key-board and foot pedals of either a piano or an organ. For example, in FIG. 1A there is illustrated foot pedals 100 which form a part of an organ 14a and which foot pedals 100 may be coupled into the signal unit 30 and the flasher circuit 67 similarly as the key 78 is coupled thereto in FIG. 2. Thus, the light 20 associated with each pedal 100 is indicated on the screen 10 and actuated upon closing of a contact corresponding to contact 62 whereby the light is coupled to the pulsating voltage in the flasher circuit to flash. Upon depression of the appropriate pedal, the light would be connected to the non-pulsating voltage in the flasher circuit and lit continuously, indicating depression of the proper organ pedal.

The invention may be embodied in other specific forms without departing from the spirit or essential characteristics thereof. The present embodiment is therefore to be considered in all respects as illustrative and not restrictive, the scope of the invention being indicated by the appendant claims rather than by the foregoing description, and all changes which come within the meaning and range of equivalency of the claims are therefore intended to be embraced therein.

What is claimed and desired to be secured by the United States Letter Patent is:

1. A teaching device for a musical instrument having a keyboard to teach pupils to read music and play visual musical exercises thereon comprising:

a screen having a musical scale inscribed thereon and a plurality of lights disposed therebehind to form, when lighted, a visual display of music on said screen, each light being oriented in relation to the musical scale to correspond to a different musical designation so that when said lights are lighted a plurality of notes within a predetermined range are displayed on the scale on said screen;

signal means coupled to a power source and coupled to said lights for lighting only a predetermined number thereof for a predetermined length of time to display a musical exercise on said screen, said signal means including a rotatable cylindrical drum having a plurality of axially extending rows of contact receiving slots, each row corresponding to a musical exercise and each slot in each row corresponding to a key on the keyboard;

a plurality of first electrical contacts, each contact adapted to be coupled to a key on the keyboard and to the corresponding light on said screen, said contacts disposed in a row axially aligned and mounted adjacent said drum;

a plurality of second electrical contacts disposed in preselected slots in a plurality of successive rows on said drum, said second contacts adapted to be coupled to a source of electrical energy, each row of said second contacts adapted to engage said corresponding first contacts when said row is disposed immediately adjacent said first contacts;

switch means coupling said first contacts to each of said lights and to the key on said keyboard corresponding to each light for displaying on said screen the predetermined number of lights in a first array, and for displaying each of said lights in a second array responsive to depression of the keys corresponding to the notes displayed on said screen;

advancing means coupled to said signal means for advancing said signal means to successively display a series of individual musical exercises on said screen;

timer means coupled to said advancing means for actuating said advancing means following the expiration of a preset period of time.

2. The device of claim 1 wherein the switch means comprises a plurality of first terminals and a plurality of second terminals each of said first and second terminals mounted adjacent a key on said keyboard and each of said second terminals coupled to the power source; a plurality of switches, each switch carried by a key on said key-board disposed adjacent said first and second terminals, each of said switches normally engaging each of said first terminals and coupled to the corresponding light on said screen; a flasher means coupling said first terminal to the power source so that when the device is actuated a pulsating voltage is applied through each first terminal to each light in said first array until the corresponding key is depressed which key then displaces the switch from the first terminal to the second terminal so that a steady voltage is applied to each light in the second array.

3. The device of claim 2 wherein the flasher means comprises; a motor adapted to be coupled to a power source; a pulse wheel engaging the output shaft of said motor and adapted to be driven thereby; a micro-switch coupled to the power source, and to said first terminal, said micro-switch operably engaging said pulse wheel so that as said motor drives said pulse wheel said micro-switch opens and closes to apply a pulsating voltage at said first terminal.

4. The signal means of claim 1 wherein the drum is constructed of an insulating material having axially aligned rows of apertures therein and a metal mesh surrounding the external surface thereof, said mesh being disposed to define, with the apertures, the contact receiving slots; said second electrical contacts comprising a plurality of metal pins adapted to be inserted in the slots contacting the mesh and extending outwardly therefrom; and a metal wiper blade, coupled to the power source and mounted adjacent the drum, said blade adapted to contact said mesh.

5. The device of claim 1 wherein the advancing means comprises a gear coaxially mounted at an end of said drum; a one-way ratchet pawl adapted to engage the teeth of said gear to drive said gear and said drum; a solenoid; a biased pivot arm connecting said pawl and said solenoid so that when said solenoid is energized said arm and said pawl advance the said gear and drum.

6. The device of claim 1 wherein the advancing means comprises a drive gear coaxially mounted at an end of said drum; an electric motor, having an output shaft, mounted adjacent said gear; a ratchet gear mounted on the output shaft and engaging the drive gear so that when the motor is energized said ratchet gear advances said drive gear and said drum.

7. The device of claim 1 wherein the said musical instrument further comprises a plurality of foot pedals, each of said foot pedals having a corresponding light on said screen; said switch means coupling said signal means and each of said pedals to the corresponding light so that the musical exercise displayed on said screen includes a predetermined number of lights corresponding to said foot pedals displayed in a first array; said lights being displayed in a second array responsive to depression of the corresponding foot pedal.

* * * * *